United States Patent
Cheng et al.

(10) Patent No.: US 10,547,486 B2
(45) Date of Patent: Jan. 28, 2020

(54) DATA TRANSMISSION METHOD AND APPARATUS

(71) Applicant: HUAWEI TECHNOLOGIES CO., LTD., Shenzhen, Guangdong (CN)

(72) Inventors: Meng Cheng, Shenzhen (CN); Yiqun Wu, Shanghai (CN); Yan Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/356,712

(22) Filed: Mar. 18, 2019

(65) Prior Publication Data

US 2019/0215222 A1 Jul. 11, 2019

Related U.S. Application Data

(63) Continuation of application No. PCT/CN2017/101937, filed on Sep. 15, 2017.

(30) Foreign Application Priority Data

Sep. 19, 2016 (CN) .......................... 2016 1 0830093

(51) Int. Cl.
*H04L 27/34* (2006.01)
*H04L 27/36* (2006.01)
(Continued)

(52) U.S. Cl.
CPC ........ *H04L 27/3405* (2013.01); *H04J 11/003* (2013.01); *H04L 25/03898* (2013.01); *H04L 27/36* (2013.01)

(58) Field of Classification Search
CPC ........... H04L 27/3405; H04L 25/03898; H04L 27/36; H04J 11/003
(Continued)

(56) References Cited

U.S. PATENT DOCUMENTS

2003/0231700 A1* 12/2003 Alamouti ............. H04B 7/0617
375/144
2013/0182791 A1* 7/2013 Dhakal ................. H04L 1/0618
375/295
(Continued)

FOREIGN PATENT DOCUMENTS

CN 102857437 A * 1/2013
CN 105634712 A 6/2016
(Continued)

OTHER PUBLICATIONS

3GPP TS 36.211 V13.2.0 (Jun. 2016) "3rd Generation Partnership Project; Technical Specification Group Radio Access Network; Evolved Universal Terrestrial Radio Access (E-UTRA); Physical channels and modulation" (Release 13), total 168 pages.
(Continued)

*Primary Examiner* — Wednel Cadeau
(74) *Attorney, Agent, or Firm* — Slater Matsil, LLP

(57) ABSTRACT

A data transmission method and apparatus are provided. The method includes: modulating, based on a codebook, every N information bits of to-be-transmitted data into one M-dimensional modulation symbol, where the codebook is generated based on an M-dimensional modulation constellation, the M-dimensional modulation constellation includes M modulation constellations, a constellation point in an $m^{th}$ modulation constellation in the M modulation constellations is obtained by mapping N information bits based on an $m^{th}$ information bit subset, the $m^{th}$ information bit subset includes information bits on some locations in the N information bits, and a union set of M information bit subsets respectively corresponding to the M modulation constellations is the N information bits, where M and N are integers greater than or equal to 2, and m is 1, 2, . . . , or M; and sending the generated M-dimensional modulation symbol.

(Continued)

The technical solutions can reduce complexity when a modulation signal is demodulated.

12 Claims, 5 Drawing Sheets

(51) Int. Cl.
*H04J 11/00* (2006.01)
*H04L 25/03* (2006.01)

(58) Field of Classification Search
USPC .......................................................... 375/261
See application file for complete search history.

(56) References Cited

U.S. PATENT DOCUMENTS

| | | |
|---|---|---|
| 2013/0230119 A1 | 9/2013 | Dhakal et al. |
| 2014/0140360 A1 | 5/2014 | Nikopour et al. |
| 2014/0369434 A1 | 12/2014 | Taherzadehboroujeni et al. |
| 2016/0049999 A1 | 2/2016 | Taherzadeh Boroujeni et al. |
| 2016/0127166 A1 | 5/2016 | Zhang et al. |

FOREIGN PATENT DOCUMENTS

| | | | |
|---|---|---|---|
| CN | 105656833 A | 6/2016 | |
| CN | 105634712 B * | 9/2018 | |
| WO | WO-2016044848 A1 * | 3/2016 | ............. H04B 7/024 |
| WO | WO-2016115531 A1 * | 7/2016 | ........ H03M 13/1114 |

OTHER PUBLICATIONS

3GPP TS 36.213 V13.2.0 (Jun. 2016) "3rd Generation Partnership Project; Technical Specification Group Radio Access Network; Evolved Universal Terrestrial Radio Access (E-UTRA); Physical layer procedures" (Release 13), total 381 pages.
International Search Report dated Dec. 1, 2017 in corresponding International Patent Application No. PCT/CN2017/101937 (4 pages).
International Search Report dated Dec. 1, 2017 in corresponding International Application No. PCT/CN20176/101937.

* cited by examiner

| Tone 1 | | | | Tone 2 | | | |
|---|---|---|---|---|---|---|---|
| 1000 | | | 0000 | 0010 | | | 0000 |
| 1001 • | | • | 0001 | 0110 • | | • | 0100 |
| 1010 | | | 0010 | 1010 | | | 1000 |
| 1011 | | | 0011 | 1110 | | | 1100 |
| 1100 | | | 0100 | 0011 | | | 0001 |
| 1101 • | | • | 0101 | 0111 • | | • | 0101 |
| 1110 | | | 0110 | 1011 | | | 1001 |
| 1111 | | | 0111 | 1111 | | | 1101 |

FIG. 8

| Tone 1 | | | | | | Tone 2 | | | | | |
|---|---|---|---|---|---|---|---|---|---|---|---|
| 100101 | 100001 | | 000001 | 000101 | | 010011 | 010001 | | 000001 | 000011 | |
| 100111 | 100011 | | 000011 | 000111 | | 010111 | 010101 | | 000101 | 000111 | |
| 110101 • | 110001 • | | 010001 | 010101 • | | 110011 • | 110001 • | | 100001 | 100011 • | |
| 110111 | 110011 | | 010011 | 010111 | | 110111 | 110101 | | 100101 | 100111 | |
| 100100 | 100000 | | 000000 | 000100 | | 010010 | 010000 | | 000000 | 000010 | |
| 100110 | 100010 | | 000010 | 000110 | | 010110 | 010100 | | 000100 | 000110 | |
| 110100 • | 110000 • | | 010000 • | 010100 • | | 110010 • | 110000 • | | 100000 • | 100010 • | |
| 110110 | 110010 | | 010010 | 010110 | | 110110 | 110100 | | 100100 | 100110 | |
| 101100 | 101000 | | 001000 | 001100 | | 011010 | 011000 | | 001000 | 001010 | |
| 101110 | 101010 | | 001010 | 001110 | | 011110 | 011100 | | 001100 | 001110 | |
| 111100 • | 111000 • | | 011000 • | 011100 • | | 111010 • | 111000 • | | 101000 • | 101010 • | |
| 111110 | 110010 | | 011010 | 011110 | | 111110 | 111100 | | 101100 | 101110 | |
| 101101 | 101001 | | 001001 | 001101 | | 011011 | 011001 | | 001001 | 001011 | |
| 101111 | 101011 | | 001011 | 001111 | | 011111 | 011101 | | 001101 | 001111 | |
| 111101 • | 111001 • | | 011001 • | 011101 • | | 111011 • | 111001 • | | 101001 • | 101011 • | |
| 111111 | 111011 | | 011011 | 011111 | | 111111 | 111101 | | 101101 | 101111 | |

FIG. 9

DATA TRANSMISSION METHOD AND APPARATUS

CROSS-REFERENCE TO RELATED APPLICATIONS

This application is a continuation of International Patent Application No. PCT/CN2017/101937, filed on Sep. 15, 2017, which claims priority to Chinese Patent Application No. 201610830093.X, filed on Sep. 19, 2016, The disclosures of the aforementioned applications are hereby incorporated by reference in their entireties.

TECHNICAL FIELD

This application relates to the communications field, and more specifically, to a data transmission method and apparatus.

BACKGROUND

Multiple access is one of core technologies at a physical layer for wireless communication, through which a radio base station can distinguish and serve a plurality of terminal users and reduce multiple-access interference. A simple orthogonal multiple access scheme is used in most of existing wireless communications systems. Because a quantity of access users who can be accommodated by an orthogonal multiple access technology is in direct proportion to a quantity of orthogonal resources, and the quantity of orthogonal resources is confined due to an orthogonality requirement, future 5G (Fifth Generation) service requirements such as wide-area continuous coverage, a high-capacity hotspot, massive connections, and low-delay access cannot be satisfied. Therefore, non-orthogonal multiple access gradually becomes a researching focus of currently attractive 5G multiple access.

A sparse code multiple access (Sparse Code Multiple Access, SCMA) technology is a typical non-orthogonal multiple access and transmission technology. Such technologies can effectively increase a network capacity, including a quantity of users who can access the system, spectral efficiency, and the like.

In the SCMA technology, an SCMA codebook is used to modulate to-be-transmitted information bits, to implement sparse spreading. In the prior art, a series of constellations may be generated based on a multidimensional mother modulation constellation, and then the constellations are used as codebooks. However, when a modulation symbol generated by using the existing SCMA technology is demodulated, a very complex solution is needed.

SUMMARY

This application provides a data transmission method and apparatus, to reduce complexity of a solution of demodulating a modulation symbol.

According to a first aspect, a data transmission method is provided. The method includes: modulating, based on a codebook, every N information bits of to-be-transmitted data into one M-dimensional modulation symbol, where the codebook is generated based on an M-dimensional modulation constellation, the M-dimensional modulation constellation includes M modulation constellations, a constellation point in an $m^{th}$ modulation constellation in the M modulation constellations is obtained by mapping N information bits based on an $m^{th}$ information bit subset, the $m^{th}$ information bit subset includes information bits on some locations in the N information bits, and a union set of M information bit subsets respectively corresponding to the M modulation constellations is the N information bits, where M and N are integers greater than or equal to 2, and m is 1, 2, . . . , or M; and sending the generated M-dimensional modulation symbol. In other words, constellation points in the M modulation constellations are respectively mapped to the M information bit subsets of the N information bits, the union set of the M information bit subsets is the N information bits, and each information bit subset includes information bits on some locations in the N information bits.

According to this embodiment of this application, the codebook used to generate the M-dimensional modulation symbol is generated based on the M-dimensional modulation constellation, the M-dimensional modulation constellation includes the M modulation constellations, the constellation point in the $m^{th}$ modulation constellation in the M modulation constellations is obtained by mapping the N information bits based on the $m^{th}$ information bit subset, the $m^{th}$ information bit subset includes the information bits on the some locations in the N information bits, and the union set of the M information bit subsets respectively corresponding to the M modulation constellations is the N information bits. In this embodiment of this application, because the M-dimensional mother modulation constellation is determined by directly selecting an information bit subset from the N information bits, complexity of demodulating a modulation symbol is reduced.

According to a second aspect, a data transmission method is provided. The method includes: receiving an M-dimensional modulation symbol; and demodulating, based on a codebook, the M-dimensional modulation symbol to obtain transmitted data, where the codebook is generated based on an M-dimensional modulation constellation, the M-dimensional modulation constellation includes M modulation constellations, a constellation point in an $m^{th}$ modulation constellation in the M modulation constellations is obtained by mapping N information bits based on an $m^{th}$ information bit subset, the $m^{th}$ information bit subset includes information bits on some locations in the N information bits, and a union set of M information bit subsets respectively corresponding to the M modulation constellations is the N information bits, where M and N are integers greater than or equal to 2, and m is 1, 2, . . . , or M.

According to this embodiment of this application, the codebook used to demodulate the M-dimensional modulation symbol is generated based on the M-dimensional modulation constellation, the M-dimensional modulation constellation includes the M modulation constellations, the constellation point in the $m^{th}$ modulation constellation in the M modulation constellations is obtained by mapping the N information bits based on the $m^{th}$ information bit subset, the $m^{th}$ information bit subset includes the information bits on the some locations in the N information bits, and the union set of the M information bit subsets respectively corresponding to the M modulation constellations is the N information bits. In this embodiment of this application, because the M-dimensional mother modulation constellation is determined by directly selecting an information bit subset from the N information bits, complexity of demodulating a modulation symbol is reduced.

According to a third aspect, this application provides a data transmission apparatus. The apparatus includes a module configured to perform the method according to the first aspect.

According to a fourth aspect, this application provides a data transmission apparatus. The apparatus includes a module configured to perform the method according to the second aspect.

According to a fifth aspect, this application provides a data transmission apparatus, including a memory, a processor, and a bus system. The memory and the processor are connected by using the bus system. The memory is configured to store an instruction, the processor is configured to execute the instruction stored in the memory, and when the processor executes the instruction stored in the memory, the execution enables the processor to perform the method according to the first aspect.

According to a sixth aspect, this application provides a data transmission apparatus, including a memory, a processor, and a bus system. The memory and the processor are connected by using the bus system. The memory is configured to store an instruction, the processor is configured to execute the instruction stored in the memory, and when the processor executes the instruction stored in the memory, the execution enables the processor to perform the method according to the second aspect.

According to a seventh aspect, a computer storage medium is provided, and is configured to store a computer program. The computer program includes an instruction used to perform the method according to the first aspect or any possible implementation of the first aspect.

According to an eighth aspect, a computer storage medium is provided, and is configured to store a computer program. The computer program includes an instruction used to perform the method according to the second aspect or any possible implementation of the second aspect.

In a first implementation of the foregoing aspects, any two of the M information bit subsets are different. Specifically, each of the M information bit subsets may further include at least one information bit the same as an information bit included in another information bit subset. In this case, an information bit can be protected in different constellations by designing an information bit subset that includes an information bit included in another information bit subset, thereby improving transmission reliability without increasing additional overheads.

With reference to the foregoing aspects or the first implementation of the foregoing aspects, in a second implementation, the codebook is specifically generated in the following manner: adjusting power of real parts and/or imaginary parts of constellation points in the M-dimensional mother modulation constellation, to obtain an adjusted M-dimensional modulation constellation; and generating the codebook based on the adjusted M-dimensional modulation constellation. Therefore, an M-dimensional mother modulation constellation is generated and power of real parts and/or imaginary parts of constellation points in the M-dimensional mother modulation constellation is adjusted to obtain a plurality of M-dimensional modulation constellations used as codebooks, thereby simplifying a codebook generation process.

With reference to the foregoing aspects or the first implementation of the foregoing aspects, in a third implementation, the codebook is specifically generated in the following manner: performing angle rotation on constellation points in the M-dimensional mother modulation constellation, to obtain a rotated M-dimensional modulation constellation; and generating the codebook based on the rotated M-dimensional mother modulation constellation. Therefore, a multidimensional mother modulation constellation is generated and power of real parts and/or imaginary parts of constellation points in the multidimensional mother modulation constellation is adjusted to obtain a plurality of multidimensional modulation constellations used as codebooks. Therefore, a quantity of multidimensional mother modulation constellations is reduced in a codebook generation process, thereby simplifying the codebook generation process.

With reference to the foregoing aspects or any implementation of the foregoing aspects, in a fourth implementation, the codebook is a set of M-dimensional modulation symbols, and the codebook is used to indicate a mapping relationship between information bits and modulation symbols.

In a further implementation of the foregoing aspects, the M-dimensional modulation constellation may further have the following characteristics: If two labels (labeling) of the N information bits are mapped to a same constellation point in one constellation in the M-dimensional modulation constellation, the two values are mapped to different constellation points in another constellation, so that one constellation point can be selected from each of the M modulation constellations to uniquely indicate a value of the N information bits. Specifically, each of the M information bit subsets includes at least one bit different from a bit included in another information bit subset. Therefore, each information bit subset is designed to include a bit that does not exist in another information bit subset, that is, information bits on different locations can be mapped to different constellation points, so that each constellation can protect the information bits on the different locations as far as possible, thereby ensuring transmission reliability of an information bit on each location.

In some implementations, the M information bit subsets include a first information bit subset and a second information bit subset. The first information bit subset includes at least one information bit different from an information bit included in the second information bit subset.

In some other implementations, an intersection set of the first information bit subset and the second information bit subset includes at least one information bit. An information bit can be protected in different constellations by designing an information bit subset that includes an information bit included in another information bit subset, thereby improving transmission reliability without increasing additional overheads.

In some other implementations, the first information bit subset and the second information bit subset have no intersection set. Therefore, different information bit subsets are designed to have no intersection set, so that constellation points in each constellation are mapped to different information bits, thereby simplifying a constellation diagram.

In the foregoing implementations, the information bit may be an X-ary information bit, where X is an integer greater than or equal to 2, a quantity of constellation points in the $m^{th}$ modulation constellation is $X^{k_m}$, $k_m$ is a quantity of bits included in the $m^{th}$ information bit subset, and $k_m$ is a positive integer less than or equal to N. For example, when X=2, the information bit is a binary information bit.

In some implementations, the constellation may be a Gray constellation, for example, a QPSK Gray constellation. This application is not limited thereto. Different M-dimensional mother modulation constellations may be generated by changing a form of the Gray constellation. Optionally, in some embodiments, the constellation may alternatively be a constellation in another form, for example, a BPSK modulation constellation.

In some implementations, the foregoing M-dimensional modulation symbol is a sparse code multiple access SCMA-dimensional modulation symbol, and the codebook is an SCMA codebook.

The aspects or other aspects of this application are more concise and easily understandable in descriptions in the following embodiments.

BRIEF DESCRIPTION OF DRAWINGS

FIG. 8 is a schematic diagram of a two-dimensional mother modulation constellation according to another embodiment of this application;

FIG. 9 is a schematic diagram of a two-dimensional mother modulation constellation according to another embodiment of this application;

DESCRIPTION OF EMBODIMENTS

Figure 1:
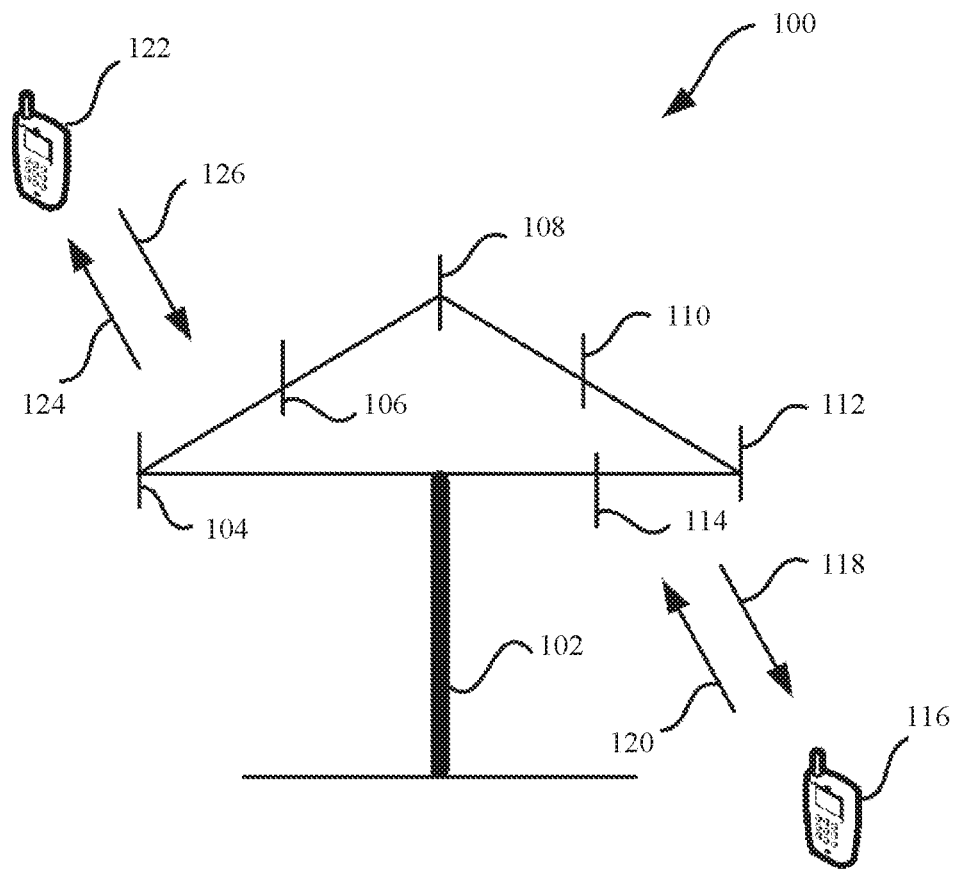
FIG. 1 is a schematic diagram of a communications system using a data transmission method in this application.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from one component interacting with another component in a local system, a distributed system, and/or across a network such as the Internet interacting with other systems by using the signal).

This application describes the embodiments with reference to a terminal device. The terminal device may also be referred to as user equipment (User Equipment, UE), an access terminal, a subscriber unit, a subscriber station, a mobile station, a mobile console, a remote station, a remote terminal, a mobile device, a user terminal, a terminal, a wireless communications device, a user agent, a user apparatus, or the like. The access terminal may be a cellular phone, a cordless phone, a SIP (Session Initiation Protocol, Session Initiation Protocol) phone, a WLL (Wireless Local Loop, wireless local loop) station, a PDA (Personal Digital Assistant, personal digital assistant), a handheld device having a wireless communication function, a computing device, another processing device connected to a wireless modem, an in-vehicle device, a wearable device, or a terminal device in a future 5G network.

In addition, this application describes the embodiments with reference to a network device. The network device may be a device such as a base station, and the base station can be used to communicate with a mobile device. The base station may be a BTS (Base Transceiver Station, base transceiver station) in GSM (Global System for Mobile Communications, Global System for Mobile Communications) or CDMA (Code Division Multiple Access, Code Division Multiple Access); or may be an NB (NodeB, NodeB) in WCDMA (Wideband Code Division Multiple Access, Wideband Code Division Multiple Access); or may be an eNB or eNodeB (Evolved Node B, evolved NodeB) in LTE (Long Term Evolution, Long Term Evolution), a relay station or an access point, an in-vehicle device, a wearable device, a network device in a future 5G network, or the like.

In addition, aspects or features of this application may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk or a magnetic tape), an optical disc (for example, a CD (Compact Disc, compact disc), a DVD (Digital Versatile Disc, digital versatile disc), a smart card and a flash memory component (for example, an EPROM (Erasable Programmable Read-Only Memory, erasable programmable read-only memory), a card, a stick, or a key drive). In addition, various storage media described in this specification may indicate one or more devices and/or other machine-readable media that are configured to store information. The term "machine-readable media" may include but is not limited to a radio channel, and various other media that can store, contain and/or carry an instruction and/or data.

FIG. 1 is a schematic diagram of a communications system using a data transmission method in this application. As shown in FIG. 1, the communications system 100 includes a base station 102, and the base station 102 may include a plurality of antenna groups. Each antenna group may include one or more antennas. For example, one antenna group may include antennas 104 and 106, another antenna group may include antennas 108 and 110, and an additional group may include antennas 112 and 114. For each antenna group, two antennas are shown in FIG. 1. However, more or fewer antennas may be used for each group. The base station 102 may additionally include a transmitter chain and a receiver chain. A person of ordinary skill in the art may understand that the transmitter chain and the receiver chain may both include a plurality of components (for example, a processor, a modulator, a multiplexer, a demodulator, a demultiplexer, or an antenna) related to signal sending and receiving.

The base station 102 may communicate with a plurality of user equipments (for example, user equipment 116 and user equipment 122). However, it may be understood that the base station 102 may communicate with any quantity of user equipments similar to the user equipment 116 or 122. The user equipment 116 and 122 each may be, for example, a cellular phone, a smartphone, a portable computer, a handheld communications device, a handheld computing device, a satellite radio apparatus, a global positioning system, a PDA, and/or any other suitable device configured to perform communication in the wireless communications system 100.

As shown in FIG. 1, the user equipment 116 communicates with the antennas 112 and 114. The antennas 112 and 114 send information to the user equipment 116 by using a forward link 118, and receive information from the user equipment 116 by using a reverse link 120. In addition, the user equipment 122 communicates with the antennas 104 and 106. The antennas 104 and 106 send information to the user equipment 122 by using a forward link 124, and receive information from the user equipment 122 by using a reverse link 126.

For example, in a frequency division duplex (Frequency Division Duplex, FDD) system, the forward link 118 may use a frequency band different from a frequency band used by the reverse link 120, and the forward link 124 may use a frequency band different from a frequency band used by the reverse link 126.

For another example, in a time division duplex (Time Division Duplex, TDD) system and a full duplex (Full Duplex) system, the forward link 118 and the reverse link 120 may use a same frequency band, and the forward link 124 and the reverse link 126 may use a same frequency band.

Each group of antennas and/or each area designed for communication is referred to as a sector of the base station 102. For example, an antenna group may be designed to communicate with user equipment in a sector within a coverage area of the base station 102. In a process in which the base station 102 communicates with the user equipment 116 and 122 by using the forward links 118 and 124 respectively, a transmit antenna of the base station 102 may improve signal-to-noise ratios of the forward links 118 and 124 through beamforming. In addition, compared with a manner in which a base station sends a signal to all user equipments served by the base station by using a single antenna, when the base station 102 sends, through beamforming, a signal to the user equipment 116 and 122 that are randomly distributed in a related coverage area, less interference is caused to a mobile device in a neighboring cell.

In a given time, the base station 102, the user equipment 116, or the user equipment 122 may be a wireless communications sending apparatus and/or a wireless communications receiving apparatus. When sending data, the wireless communications sending apparatus may modulate the data for transmission. Specifically, the wireless communications sending apparatus may obtain (for example, generate, receive from another communications apparatus, or store in a memory) a particular quantity of data bits that need to be sent to the wireless communications receiving apparatus through a channel. The data bits may be included in a transport block (or a plurality of transport blocks) of data, and the transport block may be segmented to produce a plurality of code blocks.

It should be noted that in the communications system 100 using the data transmission method and apparatus in the embodiments of this application, a plurality of terminal devices may multiplex a same time-frequency resource to perform data transmission with the base station. In addition, in a division mode of the time-frequency resource in units of resource elements (Resource Element, RE), the time-frequency resource may be a time-frequency resource block (which may also be referred to as a time-frequency resource group) including a plurality of REs. In addition, the plurality of REs may be on a same location in time domain (that is, corresponding to a same symbol) and on different locations in frequency domain (that is, corresponding to different subcarriers). Alternatively, the plurality of REs may be on different locations in time domain (that is, corresponding to different symbols) and on a same location in frequency domain (that is, corresponding to a same subcarrier). This is not particularly limited in this application.

A sparse code multiple access (Sparse Code Multiple Access, SCMA) system may be used as an example of the communications system 100. In the system, a plurality of users multiplex a same time-frequency resource block for data transmission. Each resource block includes several resource elements REs. Herein, the RE may be a subcarrier-symbol element in an OFDM technology, or may be a time-domain or frequency-domain resource element in another air interface technology. For example, in an SCMA system including K UEs, available resources are grouped into several orthogonal time-frequency resource blocks, and each resource block includes L REs. The L REs may be on a same location in time domain. When sending data, UE #k first divides the to-be-sent data into data blocks each having a size of S bits, and maps each data block to a group of modulation symbols $X\#k=\{X\#k_1, X\#k_2, \ldots, X\#k_L\}$ by checking a codebook (which is determined by the base station and delivered by the base station to the UE), where each modulation symbol corresponds to one RE in the resource block, and then generates a signal waveform based on the modulation symbols.

In addition, in SCMA, in a group of modulation symbols $X\#k=\{X\#k_1, X\#k_2, \ldots, X\#k_L\}$ corresponding to each terminal device, at least one symbol is a zero symbol, and at least one symbol is a non-zero symbol. That is, data of one terminal device is borne on only some (at least one RE) of the L REs.

It should be understood that, the SCMA system discussed above is merely an example of the communications system applicable to the data transmission method and apparatus in this application, and this application is not limited thereto. Any communications system relating to data transmission performed by a transmit end device and a receive end device based on a transmission status shall fall within the protection scope of this application.

For convenience of understanding and description, in the following embodiments, without particular descriptions, application in the SCMA system is used as an example to describe the data transmission method in the embodiments of this application.

In addition, in the SCMA system, because a plurality of user equipments multiplex a same time-frequency resource to perform transmission with the base station, the base station may perform data transmission with a plurality of user equipments at a same moment. Processes of data transmission between the base station and various user equipments are similar. Therefore, for convenience of understanding and description, descriptions are provided below by using a procedure in which the base station performs data transmission with UE #1 in the plurality of UEs as an example.

Figure 2:
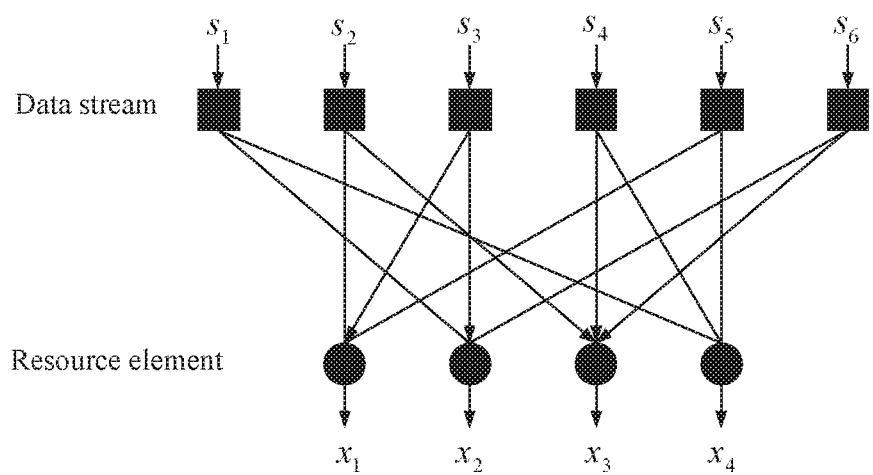
FIG. 2 is a schematic diagram of bit mapping processing in SCMA.

FIG. 2 is a schematic diagram of bit mapping processing (or, encoding processing) in SCMA using an example in which four resource elements are multiplexed for six data streams. As shown in FIG. 2, the six data streams form one packet and the four resource elements form one code unit. A resource element may be a subcarrier, or an RE, or an antenna port. In FIG. 2, if a connecting line exists between a data stream and a resource element, it indicates that after codeword mapping is performed on at least one data combination of the data stream, a non-zero modulation symbol is sent on the resource element. If no connecting line exists between a data stream and a resource element, it indicates that after codeword mapping is performed on all possible data combinations of the data stream, each modulation symbol sent on the resource element is zero. The data combination of the data stream may be understood as follows. For example, in a binary bit data stream, 00, 01, 10, and 11 are all possible two-bit data combinations. For convenience of description, data of the data streams is respectively represented by s1 to s6, and symbols sent on the resource elements are respectively represented by x1 to x4. A connecting line between a data stream and a resource element indicates that after spreading is performed on data of the data stream, a modulation symbol is sent on the resource element. The modulation symbol may be a zero symbol (corresponding to a zero element) or a non-zero symbol (corresponding to a non-zero element). If no connecting line exists between a data stream and a resource element, it indicates that after spreading is performed on data of the data stream, no modulation symbol is sent on the resource element.

It can be learned from FIG. 2 that, after spreading is performed on data of each data stream, a non-zero symbol is sent on a plurality of resource elements, and a symbol sent on each resource element is overlaying of non-zero symbols obtained after spreading is performed on data from a plurality of data streams. For example, after spreading is performed on data s3 of a data stream 3, a non-zero symbol is sent on a resource element 1 and a resource element 2, and a symbol x2 sent on a resource element 3 is overlaying of non-zero symbols obtained after spreading is performed on data s2, data s4, and data s6 respectively from a data stream 2, a data stream 4, and a data stream 6. Because a quantity of data streams may be greater than a quantity of resource elements, the SCMA system can effectively increase a network capacity, including a quantity of users who can access the system, spectral efficiency, and the like.

A codeword in the codebook usually has the following form:

$$\begin{pmatrix} c_{1,q} \\ c_{2,q} \\ \vdots \\ c_{N,q} \end{pmatrix}$$

The corresponding codebook usually has the following form:

$$\begin{pmatrix} c_{1,1} \\ c_{2,1} \\ \vdots \\ c_{N,1} \end{pmatrix}, \begin{pmatrix} c_{1,2} \\ c_{2,2} \\ \vdots \\ c_{N,2} \end{pmatrix}, \dots, \begin{pmatrix} c_{1,Q_m} \\ c_{2,Q_m} \\ \vdots \\ c_{N,Q_m} \end{pmatrix}$$

where N is a positive integer greater than 1, and may represent a quantity of resource elements included by one code unit, or may be understood as a length of a codeword; $Q_m$ is a positive integer greater than 1, represents a quantity of codewords included in the codebook, and corresponds to a modulation order, where for example, when quadrature phase shift keying (Quadrature Phase Shift Keying, QPSK) or 4-order modulation is used, $Q_m$ is 4; q is a positive integer, and $1 \leq q \leq Q_m$; and an element $c_{n,q}$ included in the codebook and the codeword is a complex number, and in mathematics, may be represented as:

$$c_{n,q} \in \{0, \alpha^* \exp(j^*\beta), 1 \leq n \leq N, 1 \leq q \leq Q_m\}$$

where $\alpha$ may be any real number, $\beta$ may be any value, and N and $Q_m$ may be positive integers.

A particular mapping relationship may be formed between the codeword in the codebook and the data. For example, a mapping relationship may be formed between the codeword in the codebook and two-bit data.

For example, "00" may correspond to a codeword 1, namely, $$\begin{pmatrix} c_{1,1} \\ c_{2,1} \\ \vdots \\ c_{N,1} \end{pmatrix};$$

"01" may correspond to a codeword 2, namely, $$\begin{pmatrix} c_{1,2} \\ c_{2,2} \\ \vdots \\ c_{N,2} \end{pmatrix};$$

"10" may correspond to a codeword 3, namely, $$\begin{pmatrix} c_{1,3} \\ c_{2,3} \\ \vdots \\ c_{N,3} \end{pmatrix};$$

and

"11" may correspond to a codeword 4, namely, $$\begin{pmatrix} c_{1,4} \\ c_{2,4} \\ \vdots \\ c_{N,4} \end{pmatrix}.$$

With reference to FIG. 2, when a connecting line exists between a data stream and a resource element, a codebook corresponding to the data stream and codewords in the codebook should have the following characteristics: For at least one codeword in the codebook, a non-zero modulation symbol is sent on a corresponding resource element. For example, when a connecting line exists between the data stream 3 and the resource element 1, at least one codeword in a codebook corresponding to the data stream 3 meets $c_{1,q} \neq 0$, where $1 \leq q \leq Q_m$.

When no connecting line exists between a data stream and a resource element, a codebook corresponding to the data stream and codewords in the codebook should have the following characteristics: For all codewords in the codebook, zero modulation symbols are sent on corresponding resource elements. For example, when no connecting line exists between the data stream 3 and the resource element 3, any codeword in a codebook corresponding to the data stream 3 meets $c_{3,q}=0$, where $1 \leq q \leq Q_m$.

In conclusion, when a modulation order is QPSK, the codebook corresponding to the data stream 3 in FIG. 2 may have the following form and characteristics:

$$\left\{ \begin{pmatrix} c_{1,1} \\ c_{2,1} \\ 0 \\ 0 \end{pmatrix}, \begin{pmatrix} c_{1,2} \\ c_{2,2} \\ 0 \\ 0 \end{pmatrix}, \begin{pmatrix} c_{1,3} \\ c_{2,3} \\ 0 \\ 0 \end{pmatrix}, \begin{pmatrix} c_{1,4} \\ c_{2,4} \\ 0 \\ 0 \end{pmatrix} \right\}$$

where $c_{n,q}=\alpha*\exp(j*\beta), 1 \leq n \leq 2, 1 \leq q \leq 4$; $\alpha$ and $\beta$ may be any real numbers; for any q, $1 \leq q \leq 4$; $c_{1,q}$ and $c_{2,q}$ are not zero at the same time; and at least one pair of $q_1$ and $q_2$ meet $c_{1,q_1} \neq 0$ and $c_{2,q_2} \neq 0$, where $1 \leq q_1$ and $q_2 \leq 4$.

For example, if the data s3 of the data stream 3 is "10", according to the foregoing mapping rule, the data combination is mapped to a codeword, that is, a four-dimensional complex vector:

$$\begin{pmatrix} c_{1,3} \\ c_{2,3} \\ 0 \\ 0 \end{pmatrix}.$$

It should be understood that the SCMA system discussed above is merely an example of the communications system applicable to the data transmission method and apparatus in this application, and this application is not limited thereto. Any other communications system that can enable terminal devices to multiplex a same time-frequency resource within a same time period to perform data transmission shall fall within the protection scope of in this application.

Usually, the codebook may be derived from one or more multidimensional complex constellations. For example, for convenience of understanding and description, in the following embodiments, without particular descriptions, application in the SCMA system is used as an example to describe the data transmission method in the embodiments of this application.

In addition, in the embodiments of this application, the foregoing mapping processing process may be similar to a mapping processing process in an existing SCMA system. Herein, to avoid repetition, details of the mapping processing process are omitted.

The bit mapping processing in SCMA is described above with reference to FIG. 2. A codebook generation method provided in the embodiments of this application is described in detail below with reference to FIG. 3.

Figure 3:
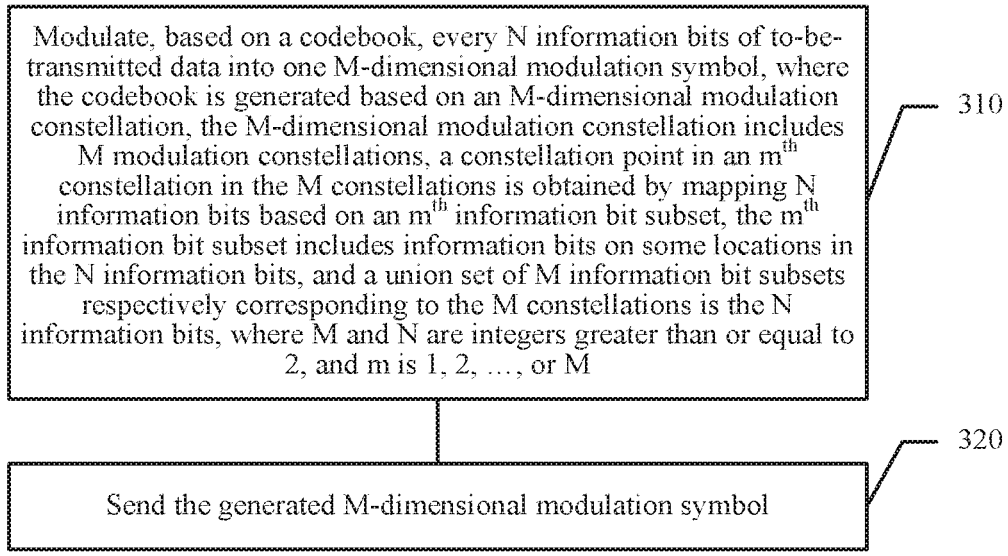
FIG. 3 is a schematic flowchart of a data transmission method according to an embodiment of this application.

FIG. 3 is a schematic flowchart of a data transmission method according to an embodiment of this application. The method in FIG. 3 may be performed by a transmit end. For example, the transmit end may be the base station or the UE in FIG. 1. The method in FIG. 3 includes the following content.

310. Modulate, based on a codebook, every N information bits of to-be-transmitted data into one M-dimensional modulation symbol, where the codebook is generated based on an M-dimensional modulation constellation, the M-dimensional modulation constellation includes M modulation constellations, a constellation point in an $m^{th}$ modulation constellation in the M modulation constellations is obtained by mapping N information bits based on an $m^{th}$ information bit subset, the $m^{th}$ information bit subset includes information bits on some locations in the N information bits, and a union set of M information bit subsets respectively corresponding to the M modulation constellations is the N information bits, where M and N are integers greater than or equal to 2, and m is 1, 2, . . . , or M.

320. Send the generated M-dimensional modulation symbol.

According to this embodiment of this application, the codebook used to generate the M-dimensional modulation symbol is generated based on the M-dimensional modulation constellation, the M-dimensional modulation constellation includes the M modulation constellations, the constellation point in the $m^{th}$ modulation constellation in the M modulation constellations is obtained by mapping the N information bits based on the $m^{th}$ information bit subset, the $m^{th}$ information bit subset includes the information bits on the some locations in the N information bits, and the union set of the M information bit subsets respectively corresponding to the M modulation constellations is the N information bits. In this embodiment of this application, because the M-dimensional mother modulation constellation is determined by directly selecting an information bit subset from the N information bits, complexity of demodulating a modulation symbol is reduced.

The information bit may be an X-ary information bit, where X is an integer greater than or equal to 2, a quantity of constellation points in the $m^{th}$ modulation constellation is $X^{k_m}$, $k_m$ is a quantity of bits included in the $m^{th}$ information bit subset, and $k_m$ is a positive integer less than or equal to N. For example, when X=2, the information bit is a binary information bit.

The constellation may be a Gray constellation, for example, a QPSK Gray constellation or a QAM Gray constellation, but this embodiment of this application is not limited thereto. Different M-dimensional mother modulation constellations may further be generated by changing a form of the Gray constellation. Optionally, in some embodiments, the constellation may alternatively be a constellation in another form, for example, a BPSK modulation constellation.

In this embodiment of this application, the M-dimensional modulation constellation in step 310 may also be referred to as an M-dimensional mother modulation constellation, and is used to map the N information bits to constellation points in the M modulation constellations, that is, to select one constellation point from each of the M modulation constellations to jointly indicate a value of the N information bits. The constellation point in each of the M modulation constellations may be determined by a subset of the N information bits, and the union set of the M information bit subsets corresponding to the M modulation constellations is the N information bits. In other words, the M information bit subsets respectively correspond to the M modulation constellations, each information bit subset includes bits on some locations in the N information bits, and that the M information bit subsets can cover the N information bits is satisfied.

Using mapping between three information bits (b2, b1, and b0) and a two-dimensional mother modulation constellation as an example, the two-dimensional mother modulation constellation may include a first constellation and a second constellation. It is assumed that a constellation point in the first constellation is determined by information bits on locations b2 and b1, and that a constellation point in the second constellation is determined by information bits on locations b2 and b0. That is, when the three information bits are mapped to the constellation point in the first constellation, the constellation point is determined only by values of the information bits on the locations b2 and b1. When the three information bits are mapped to the constellation point in the second constellation, the constellation point is determined only by values of the information bits on the locations b2 and b0. For example, values 001 and 000 of the three information bits may be mapped to a constellation point (a, b) in the first constellation, and values 000 and 010 of the three information bits are mapped to a constellation point (a, b) in the second constellation. In this case, the constellation point (a, b) in the first constellation and the constellation point (a, b) in the second constellation may be used to jointly indicate the value 000 of the three information bits. For another example, values 011 and 010 of the three information bits are mapped to a constellation point (−a, b) in the first constellation. Therefore, the constellation point (−a, b) in the first constellation and the constellation point (a, b) in the second constellation may be used to jointly indicate the value 010 of the three information bits, and by analog.

In some embodiments, the M-dimensional mother modulation constellation may alternatively be designed as follows: If two labels (labeling) representing the N information bits are mapped to a same constellation point in one constellation in the M-dimensional mother modulation constellation, the two values are mapped to different constellation points in another constellation, so that one constellation point can be selected from each of the M modulation constellations to uniquely indicate a value of the N information bits. Herein, the label is used to indicate a value of N information bits corresponding to each constellation point. Still using the mapping between the three information bits (b2, b1, and b0) and the two-dimensional mother modulation constellation as an example, values of 000 and 010 of the three information bits are mapped to a constellation point (a, b) in the second constellation, and the two values may be respectively mapped to constellation points (a, b) and (−a, b) in the first constellation, so that (a, b) and (−a, b) may be used to uniquely indicate the value 010 of the three information bits.

In some embodiments, any two of the M information bit subsets are different. Specifically, each of the M information bit subsets includes at least one information bit different from an information bit included in another information bit subset. For example, the M information bit subsets may include a first information bit subset and a second information bit subset. The first information bit subset includes at least one information bit different from an information bit included in the second information bit subset.

According to an embodiment of this application, each information bit subset is designed to include an information bit that does not exist in another information bit subset, that is, information bits on different locations can be mapped to different constellation points, so that each constellation can protect the information bits on the different locations as far as possible, thereby ensuring transmission reliability of an information bit on each location.

In some embodiments, each of the M information bit subsets may alternatively include at least one information bit the same as an information bit included in another information bit subset. For example, the M information bit subsets may include a first information bit subset and a second information bit subset. The first information bit subset includes at least one information bit the same as an information bit included in the second information bit subset. That is, an intersection set of the first information bit subset and the second information bit subset includes at least one information bit.

According to this embodiment of this application, an information bit can be protected in different constellations by designing an information bit subset that includes an information bit included in another information bit subset, thereby improving transmission reliability without increasing additional overheads.

Alternatively, in another embodiment, an information bit included in each of the M information bit subsets is different from an information bit included in another information bit subset. For example, the M information bit subsets may include a first information bit subset and a second information bit subset, and the first information bit subset and the second information bit subset have no intersection set.

According to this embodiment of this application, different information bit subsets are designed to have no intersection set, so that constellation points in each constellation correspond to different information bits, thereby simplifying a constellation diagram.

In some embodiments, the codebook is specifically generated in the following manner: adjusting power of real parts and/or imaginary parts of constellation points in the M-dimensional mother modulation constellation, to obtain an adjusted M-dimensional modulation constellation; and generating the codebook based on the adjusted M-dimensional modulation constellation.

Specifically, the power of the real parts and/or the imaginary parts of the constellation points in the M-dimensional mother modulation constellation may be amplified and reduced according to different ratios to generate a plurality of M-dimensional modulation constellations. Power of real parts and/or imaginary parts of constellation points in the M-dimensional modulation constellations may be the same or different.

According to this embodiment of this application, an M-dimensional mother modulation constellation is generated and power of real parts and/or imaginary parts of constellation points in the M-dimensional mother modulation constellation is adjusted to obtain a plurality of M-dimensional modulation constellations used as codebooks, thereby simplifying a codebook generation process.

Alternatively, in another embodiment, the codebook is specifically generated in the following manner: performing angle rotation on constellation points in the M-dimensional modulation constellation, to obtain a rotated M-dimensional modulation constellation; and generating the codebook based on the rotated M-dimensional mother modulation constellation.

Specifically, the M-dimensional mother modulation constellation may be rotated by different angles to generate a plurality of M-dimensional modulation constellations, and the plurality of M-dimensional modulation constellations are used as codebooks. For example, the entire M-dimensional mother modulation constellation is rotated by a first angle to generate an M-dimensional modulation constellation, and is rotated by a second angle to generate another M-dimensional modulation constellation.

According to this embodiment of this application, a multidimensional mother modulation constellation is generated and power of real parts and/or imaginary parts of constellation points in the multidimensional mother modulation constellation is adjusted to obtain a plurality of multidimensional modulation constellations used as codebooks. Therefore, a quantity of multidimensional mother modulation constellations is reduced in a codebook generation process, thereby simplifying the codebook generation process.

Alternatively, in another embodiment, rotation by different angles and power adjustment may be performed on the M-dimensional mother modulation constellation to generate a plurality of M-dimensional modulation constellations. For example, the M-dimensional mother modulation constellation may be first rotated by different angles, and power adjustment is then performed on the M-dimensional mother modulation constellation, to generate a plurality of M-dimensional modulation constellations. For another example, alternatively, the M-dimensional mother modulation constellation may be rotated to obtain an M-dimensional modulation constellation, and power adjustment may be performed on the M-dimensional mother modulation constellation to obtain another M-dimensional modulation constellation.

The codebook in this embodiment may be applied to data transmission for a single data layer, or may be applied to transmission for a plurality of data layers. When applied to data transmission for a plurality of data layers, codebooks used for the data layers are different, but are obtained based on a same M-dimensional mother modulation constellation.

Alternatively, in another embodiment, when data on a plurality of data layers is transmitted, the codebook in step 310 may be referred to as a first codebook, and is used to transmit data on a first data layer. The method in FIG. 3 further includes: modulating to-be-transmitted data on a second data layer based on a second codebook, to generate an M-dimensional modulation symbol for the second data layer, where the second codebook is obtained based on a second M-dimensional mother modulation constellation, a method for determining the second M-dimensional mother modulation constellation is the same as a method for determining the M-dimensional mother modulation constellation, and the M-dimensional mother modulation constellation is different from the second M-dimensional mother modulation constellation.

Specifically, in this embodiment of this application, a plurality of different M-dimensional mother modulation constellations may be determined based on the foregoing method, and the plurality of M-dimensional mother modulation constellations are respectively used as a plurality of codebooks. Alternatively, in this embodiment of this application, an operation or processing may be performed on a plurality of M-dimensional mother modulation constellations to obtain more M-dimensional modulation constellations used as a plurality of codebooks.

According to this embodiment of this application, the method in FIG. 3 may further include: obtaining at least one stored codebook from a memory.

For example, the transmit end or a receive end may prestore an agreed codebook, and the codebook may be determined based on the foregoing method, or may be determined by one party and then sent to the other party. According to this embodiment of this application, the codebook may be stored in storage media of both parties. The prestored codebook may be read from the storage medium when information bits need to be transmitted, and the read codebook may be used to perform modulation or demodulation, thereby improving modulation or demodulation efficiency.

For example, alternatively, an M-dimensional mother modulation constellation may be determined by using the foregoing method when a codebook needs to be used to perform modulation or demodulation, and the codebook is determined accordingly. For example, a mother codebook may be first determined to obtain a modulation symbol corresponding to the mother codebook, and power adjustment and angle adjustment are then performed on the modulation symbol for transmission.

The data transmission method provided in this embodiment of this application is described above from the perspective of the transmit end with reference to FIG. 3, and a data transmission method provided in an embodiment of this application is described below from a perspective of a receive end with reference to FIG. 4.

Figure 4:
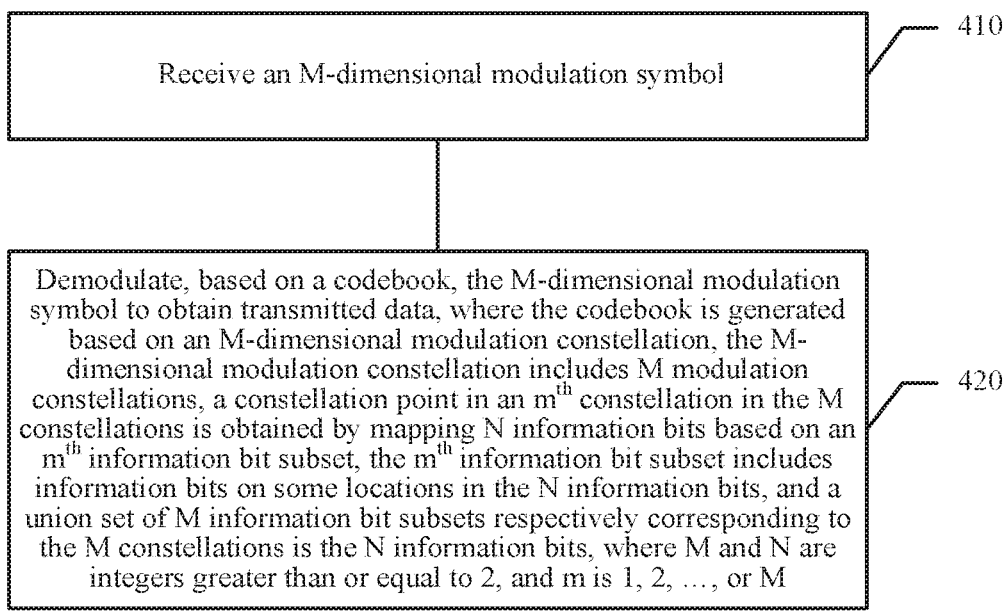
FIG. 4 is a schematic flowchart of a data transmission method according to an embodiment of this application.

FIG. 4 is a schematic flowchart of a data transmission method according to an embodiment of this application. The method in FIG. 4 may be performed by a receive end. For example, the receive end may be the base station or the UE in FIG. 1. The method in FIG. 4 includes the following content. The embodiment of FIG. 4 corresponds to the method in FIG. 3, and detailed descriptions are properly omitted herein.

410. Receive an M-dimensional modulation symbol.

420. Demodulate, based on a codebook, the M-dimensional modulation symbol to obtain transmitted data, where the codebook is generated based on an M-dimensional modulation constellation, the M-dimensional modulation constellation includes M modulation constellations, a constellation point in an $m^{th}$ modulation constellation in the M modulation constellations is obtained by mapping N information bits based on an $m^{th}$ information bit subset, the $m^{th}$ information bit subset includes information bits on some locations in the N information bits, and a union set of M information bit subsets respectively corresponding to the M modulation constellations is the N information bits, where M and N are integers greater than or equal to 2, and m is 1, 2, . . . , or M. The codebook in this step is the same as the codebook used by the transmit end to generate the M-dimensional modulation symbol. Correspondingly, the M-dimensional modulation constellation in this step is also the same as the M-dimensional modulation constellation in step 310, and may also be referred to as an M-dimensional mother modulation constellation.

According to this embodiment of this application, the codebook used to demodulate the M-dimensional modulation symbol is generated based on the M-dimensional modulation constellation, the M-dimensional modulation constellation includes the M modulation constellations, the constellation point in the $m^{th}$ modulation constellation in the M modulation constellations is obtained by mapping the N information bits based on the $m^{th}$ information bit subset, the $m^{th}$ information bit subset includes the information bits on the some locations in the N information bits, and the union set of the M information bit subsets respectively corresponding to the M modulation constellations is the N information bits. In this embodiment of this application, because the M-dimensional mother modulation constellation is determined by directly selecting an information bit subset from the N information bits, complexity of demodulating a modulation symbol is reduced.

According to this embodiment of this application, any two of the M information bit subsets are different.

According to this embodiment of this application, the codebook is specifically generated in the following manner: adjusting power of real parts and/or imaginary parts of constellation points in the M-dimensional mother modulation constellation, to obtain an adjusted M-dimensional modulation constellation; and generating the codebook based on the adjusted M-dimensional modulation constellation.

According to this embodiment of this application, the codebook is specifically generated in the following manner: performing angle rotation on constellation points in the M-dimensional mother modulation constellation, to obtain a rotated M-dimensional modulation constellation; and generating the codebook based on the rotated M-dimensional mother modulation constellation.

According to this embodiment of this application, the codebook is a set of M-dimensional modulation symbols, and the codebook is used to indicate a mapping relationship between information bits and modulation symbols.

According to this embodiment of this application, the method in FIG. 4 may further include: obtaining at least one stored codebook from a memory.

This embodiment of this application is described below in more detail with reference to specific examples. For convenience of description, a two-dimensional mother modulation constellation is used as an example for description. A design solution of other mother modulation constellations in M dimensions (where M is greater than 2) is similar to a design solution of the two-dimensional mother modulation constellation. It should be understood that, the following method for determining the two-dimensional mother modulation constellation may also be similarly applied to determining of various multidimensional mother modulation constellations. To avoid repetition, details are not described herein again.

Figure 5:
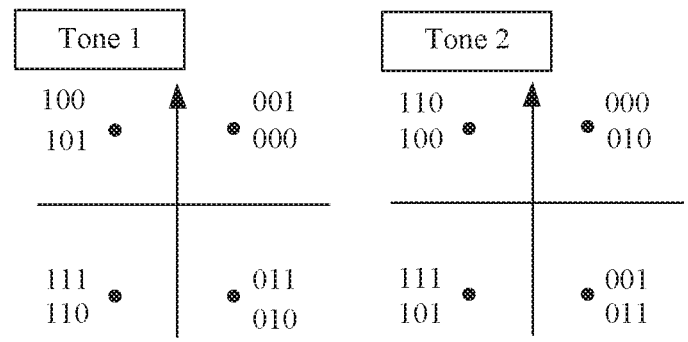
FIG. 5 is a schematic diagram of a two-dimensional mother modulation constellation according to an embodiment of this application.

FIG. 5 is a schematic diagram of a two-dimensional mother modulation constellation according to an embodiment of this application.

In this embodiment, a solution of a two-dimensional mother modulation constellation used to generate a codebook including eight codewords (namely, an 8-point codebook) is designed, where the 8-point codebook may be used to modulate three information bits to generate a two-dimensional modulation symbol. In the following, the three information bits are represented by b2, b1, and b0. For example, the two-dimensional mother modulation constellation includes constellations in two dimensions: a first constellation and a second constellation. Each constellation is used to generate a symbol in one dimension of the two-dimensional modulation symbol. For example, a symbol in a first dimension of the two-dimensional modulation symbol is generated based on a first constellation diagram, and a symbol in a second dimension of the two-dimensional modulation symbol is generated based on a second constellation diagram. The symbol in each dimension may be transmitted on one tone. For example, the symbol in the first dimension may be transmitted on a tone (tone) 1, and the symbol in the second dimension may be transmitted on a tone 2.

In this embodiment, constellation points in the two-dimensional mother modulation constellation may be symmetrical with respect to an x axis and a y axis. For example, coordinates of the constellation points are respectively (±a, ±b), where a and b are positive real numbers. The first constellation may be a 4-point QPSK Gray modulation constellation determined by b2 and b1, and the second constellation may be a 4-point QPSK Gray modulation constellation determined by b2 and b0.

Referring to FIG. 5, the first constellation may be determined by information bits on locations b2 and b1, and an information bit on a location b0 cannot be used for distinguishing. In other words, for each constellation point, information bits on locations b2 and b1 may be 1 or 0, and an information bit on a location b0 is 1 and 0. For example, the constellation point (a, b) corresponds to values 001 and 000 of the three information bits in which b2 is 0 and b1 is 0, the constellation point (a, −b) corresponds to values 100 and 101 of the three information bits in which b2 is 1 and b1 is 0, the constellation point (−a, b) corresponds to values 011 and 010 of the three information bits in which b2 is 0 and b1 is 1, and the constellation point (−a, −b) corresponds to values 111 and 110 of the three information bits in which b2 is 1 and b1 is 1.

The second constellation may be determined by information bits on locations b2 and b0, and a bit on a location b1 cannot be used for distinguishing. In other words, for each constellation point, information bits on locations b2 and b0 may be 1 or 0, and an information bit on a location b1 may be 1 and 0. For example, the constellation point (a, b) corresponds to values 000 and 010 of the three information bits in which b2 is 0 and b0 is 0, the constellation point (a, −b) corresponds to values 110 and 100 of the three information bits in which b2 is 1 and b0 is 0, the constellation point (−a, b) corresponds to values 110 and 100 of the three information bits in which b2 is 1 and b0 is 0, and the constellation point (−a, −b) corresponds to values 111 and 101 of the three information bits in which b2 is 1 and b0 is 1.

Table 1 shows the 8-point SCMA codebook obtained based on the two-dimensional mother modulation constellation. Referring to Table 1 and FIG. 5, the value 000 of the information bits corresponds to the constellation point (a, b) in the first constellation and the constellation point (a, b) in the second constellation. That is, the value 000 of the three information bits is mapped to both the constellation point (a, b) in the first constellation and the constellation point (a, b) in the second constellation. Therefore, the constellation point (a, b) in the first constellation and the constellation point (a, b) in the second constellation may be used to jointly indicate the value 000 of the information bits. Likewise, the value 001 of the information bits may correspond to the constellation point (a, b) in the first constellation and the constellation point (a, −b) in the second constellation. That is, the value 001 of the information bits is mapped to both the constellation point (a, b) in the first constellation and the constellation point (a, −b) in the second constellation. Therefore, the constellation point (a, b) in the first constellation and the constellation point (a, −b) in the second constellation may be used to jointly indicate the value 001 of the information bits, and by analog.

Based on the foregoing design, the three information bits may be mapped to two 4-point QPSK Gray constellations included in the two-dimensional mother modulation constellation.

TABLE 1

| Bit | $I_1$ | $Q_1$ | $I_2$ | $Q_2$ |
|---|---|---|---|---|
| 000 | a | b | a | b |
| 001 | a | b | a | −b |
| 010 | a | −b | a | b |
| 011 | a | −b | a | −b |
| 100 | −a | b | −a | b |
| 101 | −a | b | −a | −b |
| 110 | −a | −b | −a | b |
| 111 | −a | −b | −a | −b |

Figure 6:
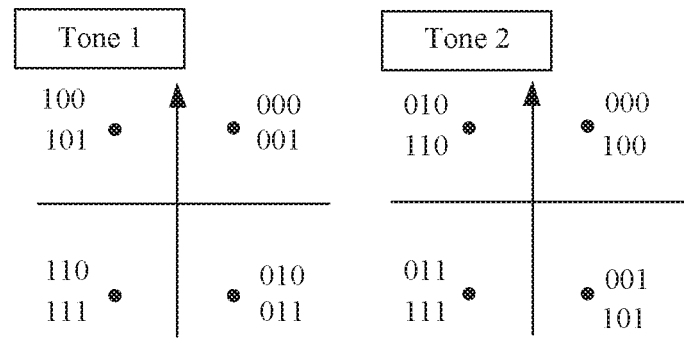
FIG. 6 is a schematic diagram of a two-dimensional mother modulation constellation according to another embodiment of this application.

FIG. 6 is a schematic diagram of a two-dimensional mother modulation constellation according to another embodiment of this application.

Similar to foregoing embodiments, in this embodiment, a solution of a two-dimensional mother modulation constellation used to generate a codebook including eight codewords (namely, an 8-point codebook) is designed. The two-dimensional mother modulation constellation is similar to that in the embodiment of FIG. 5. To avoid repetition, details are not described herein again.

Different from the embodiment of FIG. 5, in this embodiment, the first constellation may be a 4-point QPSK Gray modulation constellation determined by b2 and b1, and the second constellation may be a 4-point QPSK Gray modulation constellation determined by b1 and b0.

Referring to FIG. 6, the first constellation may be determined by information bits on locations b2 and b1, and an information bit on a location b0 cannot be used for distinguishing. In other words, for each constellation point, values of information bits on locations b2 and b1 may be 1 or 0, and a value of an information bit on a location b0 is 1 and 0. For example, the constellation point (a, b) corresponds to values 001 and 000 of the three information bits in which b2 is 0 and b1 is 0, the constellation point (a, −b) corresponds to values 010 and 011 of the three information bits in which b2 is 0 and b1 is 1, the constellation point (−a, b) corresponds to values 100 and 101 of the three information bits in which b2 is 1 and b1 is 0, and the constellation point (−a, −b) corresponds to values 111 and 110 of the three information bits in which b2 is 1 and b1 is 1.

The second constellation may be determined by information bits on locations b1 and b0, and an information bit on a location b2 cannot be used for distinguishing. In other words, for each constellation point, information bits on locations b1 and b0 may be 1 or 0, and an information bit on a location b2 is 1 and 0. For example, the constellation point (a, b) corresponds to values 000 and 100 of the three information bits in which b1 is 0 and b0 is 0, the constellation point (a, −b) corresponds to values 001 and 101 of the three information bits in which b1 is 0 and b0 is 1, the constellation point (−a, b) corresponds to values 110 and 010 of the three information bits in which b1 is 1 and b0 is 0, and the constellation point (−a, −b) corresponds to values 111 and 011 of the three information bits in which b1 is 1 and b0 is 1.

Table 2 shows the 8-point SCMA codebook obtained based on the two-dimensional mother modulation constellation shown in FIG. 6. Referring to Table 2 and FIG. 6, the value 000 of the information bits corresponds to the constellation point (a, b) in the first constellation and the constellation point (a, b) in the second constellation. That is, the value 000 of the information bits is mapped to both the constellation point (a, b) in the first constellation and the constellation point (a, b) in the second constellation. Therefore, the constellation point (a, b) in the first constellation and the constellation point (a, b) in the second constellation may be used to jointly indicate the value 000 of the information bits. Likewise, the value 001 of the information bits may correspond to the constellation point (a, b) in the first constellation and the constellation point (a, −b) in the second constellation. That is, the value 001 of the information bits is mapped to both the constellation point (a, b) in the first constellation and the constellation point (a, −b) in the second constellation. Therefore, the constellation point (a, b) in the first constellation and the constellation point (a, −b) in the second constellation may be used to jointly indicate the value 001 of the information bits, and by analog.

Based on the foregoing design, the 8-point information bit may be mapped to two 4-point QPSK Gray constellations included in the two-dimensional mother modulation constellation.

TABLE 2

| Bit | $I_1$ | $Q_1$ | $I_2$ | $Q_2$ |
|---|---|---|---|---|
| 000 | a | b | a | b |
| 001 | a | b | a | −b |
| 010 | a | −b | −a | b |
| 011 | a | −b | −a | −b |
| 100 | −a | b | a | b |
| 101 | −a | b | a | −b |
| 110 | −a | −b | −a | b |
| 111 | −a | −b | −a | −b |

Figure 7:
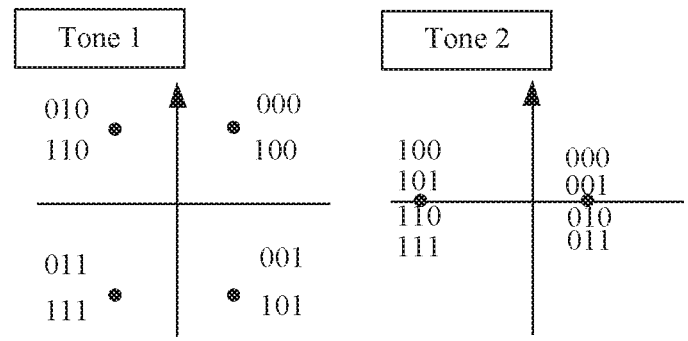
FIG. 7 is a schematic diagram of a two-dimensional mother modulation constellation according to another embodiment of this application.

FIG. 7 is a schematic diagram of a two-dimensional mother modulation constellation according to another embodiment of this application.

In this embodiment, a solution of a two-dimensional mother modulation constellation used to generate a codebook including eight codewords (namely, an 8-point codebook) is designed, where the 8-point codebook may be used to modulate three information bits to generate a two-dimensional modulation symbol. In the following, the three information bits are represented by b2, b1, and b0. For example, the two-dimensional mother modulation constellation includes constellations in two dimensions: a first constellation and a second constellation. Each constellation is used to generate a symbol in one dimension of the two-dimensional modulation symbol. For example, a symbol in a first dimension of the two-dimensional modulation symbol is generated based on a first constellation diagram, and a symbol in a second dimension of the two-dimensional modulation symbol is generated based on a second constellation diagram. The symbol in each dimension may be transmitted on one tone. For example, the symbol in the first dimension may be transmitted on a tone (tone) 1, and the symbol in the second dimension may be transmitted on a tone 2.

In this embodiment, constellation points in the first constellation may be symmetrical with respect to an x axis and a y axis. For example, coordinates thereof are respectively (±a, ±b), where a and b are positive real numbers. Constellation points in the second constellation may be symmetrical with respect to a y axis. For example, coordinates thereof are respectively (±c, 0). The first constellation may be a 4-point QPSK Gray modulation constellation determined by b1 and b0, and the second constellation may be a 2-point BPSK modulation constellation determined by b2.

Referring to FIG. 7, the first constellation may be a QPSK Gray constellation determined by an information bit on a location b1 and an information bit on a location b0, and an information bit on a location b2 cannot be used for distinguishing. In other words, for each constellation point, values of information bits on locations b1 and b0 may be 1 or 0, and a value of an information bit on a location b2 may be 1 and 0. For example, the constellation point (a, b) corresponds to values 100 and 000 of the three information bits in which b1 is 0 and b0 is 0, the constellation point (a, −b) corresponds to values 001 and 101 of the three information bits in which b1 is 0 and b0 is 1, the constellation point (−a, b) corresponds to values 010 and 110 of the three information bits in which b1 is 1 and b0 is 0, and the constellation point (−a, −b) corresponds to values 011 and 111 of the three information bits in which b1 is 1 and b0 is 1.

The second constellation may be a BPSK modulation constellation determined by an information bit on a location b2, and information bits on locations b1 and b0 cannot be used for distinguishing. In other words, for each constellation point, a value of an information bit on a location b2 may be 1 or 0, a value of an information bit on a location b1 may be 1 and 0, and a value of an information bit on a location b0 may also be 1 and 0. For example, the constellation point (c, 0) corresponds to values 000, 001, 010, and 011 of the three information bits in which b2 is 0, and the constellation point (−c, 0) corresponds to values 100, 101, 110, and 111 of the three information bits in which b2 is 1.

Table 3 shows the 8-point SCMA codebook obtained based on the two-dimensional mother modulation constellation shown in FIG. 7. Referring to Table 3 and FIG. 7, the value 000 of the information bits corresponds to the constellation point (a, b) in the first constellation and the constellation point (c, 0) in the second constellation. That is, the value 000 of the information bits is mapped to both the constellation point (a, b) in the first constellation and the constellation point (c, 0) in the second constellation. Therefore, the constellation point (a, b) in the first constellation and the constellation point (c, 0) in the second constellation may be used to jointly indicate the value 000 of the information bits. Likewise, the value 001 of the information bits may correspond to the constellation point (a, −b) in the first constellation and the constellation point (c, 0) in the second constellation. That is, the value 001 of the information bits is mapped to both the constellation point (a, −b) in the first constellation and the constellation point (c, 0) in the second constellation. Therefore, the constellation point (a, −b) in the first constellation and the constellation point (c, 0) in the second constellation may be used to jointly indicate the value 001 of the information bits, and by analog.

Based on the foregoing design, the 8-point information bit may be mapped to one 4-point QPSK Gray constellation and one BPSK modulation constellation included in the two-dimensional mother modulation constellation.

TABLE 3

| Bit | $I_1$ | $Q_1$ | $I_2$ | $Q_2$ |
|-----|-------|-------|-------|-------|
| 000 | a | b | c | 0 |
| 001 | a | −b | c | 0 |
| 010 | −a | b | c | 0 |
| 011 | −a | −b | c | 0 |
| 100 | a | b | −c | 0 |
| 101 | a | −b | −c | 0 |
| 110 | −a | b | −c | 0 |
| 111 | −a | −b | −c | 0 |

FIG. 8 is a schematic diagram of a two-dimensional mother modulation constellation according to another embodiment of this application.

In this embodiment, a solution of a two-dimensional mother modulation constellation used to generate a codebook including 16 codewords (namely, a 16-point codebook) is designed, where the 16-point codebook may be used to modulate four information bits. In the following, the four information bits are represented by b3, b2, b1, and b0.

In this embodiment, constellation points in the two-dimensional mother modulation constellation may be symmetrical with respect to an x axis and a y axis. For example, coordinates of constellation points in each constellation are respectively (±a, ±b), where a and b are positive real numbers. A first constellation may be a 4-point QPSK Gray modulation constellation determined by b3 and b2, and a second constellation may be a 4-point QPSK Gray modulation constellation determined by b1 and b0.

Referring to FIG. 8, the first constellation may be determined by information bits on locations b3 and b2, and information bits on locations b1 and b0 cannot be used for distinguishing. In other words, for each constellation point, values of information bits on locations b3 and b2 may be 1 or 0, and values of information bits on locations b1 and b0 may be 1 and 0. For example, the constellation point (a, b) corresponds to four information bits 0000, 0001, 0010, and 0011 in which b3 is 0 and b2 is 0, the constellation point (a, −b) corresponds to four information bits 0100, 0101, 0110, and 0111 in which b3 is 0 and b2 is 1, the constellation point (−a, b) corresponds to four information bits 1000, 1001, 1010, and 1011 in which b3 is 1 and b2 is 0, and the constellation point (−a, −b) corresponds to four information bits 1100, 1101, 1110, and 1111 in which b3 is 1 and b2 is 1.

The second constellation may be determined by information bits on locations b1 and b0, and information bits on locations b3 and b2 cannot be used for distinguishing. In other words, for each constellation point, information bits on locations b1 and b0 may be 1 or 0, and information bits on locations b3 and b2 are 1 and 0. For four information bits corresponding to each constellation point, specifically refer to FIG. 8, and details are not described herein again.

Table 4 shows the 16-point SCMA codebook obtained based on the two-dimensional mother modulation constellation shown in FIG. 8. Referring to Table 4 and FIG. 8, the constellation point (a, b) in the first constellation and the constellation point (a, b) in the second constellation may be used to jointly indicate the value 0000 of the information bits. Likewise, the constellation point (a, b) in the first constellation and the constellation point (a, −b) in the second constellation may be used to jointly indicate the value 0001 of the information bits, and by analog.

Based on the foregoing design, the 16-point information bit may be mapped to two 4-point QPSK Gray constellations included in the two-dimensional mother modulation constellation.

TABLE 4

| Bit | $I_1$ | $Q_1$ | $I_2$ | $Q_2$ |
|-----|-------|-------|-------|-------|
| 0000 | a | b | a | b |
| 0001 | a | b | a | −b |
| 0010 | a | b | −a | b |
| 0011 | a | b | −a | −b |
| 0100 | a | −b | a | b |
| 0101 | a | −b | a | −b |
| 0110 | a | −b | −a | b |
| 0111 | a | −b | −a | −b |
| 1000 | −a | b | a | b |
| 1001 | −a | b | a | −b |
| 1010 | −a | b | −a | b |
| 1011 | −a | b | −a | −b |
| 1100 | −a | −b | a | b |

TABLE 4-continued

| Bit | $I_1$ | $Q_1$ | $I_2$ | $Q_2$ |
|---|---|---|---|---|
| 1101 | −a | −b | a | −b |
| 1110 | −a | −b | −a | b |
| 1111 | −a | −b | −a | −b |

FIG. 9 is a schematic diagram of a two-dimensional mother modulation constellation according to another embodiment of this application.

In this embodiment, a solution of a two-dimensional mother modulation constellation used to generate a codebook including 64 codewords (namely, a 64-point codebook) is designed, where the 64-point codebook may be used to modulate six information bits to generate a two-dimensional modulation symbol. In the following, the six information bits are represented by b5, b4, b3, b2, b1, and b0.

In this embodiment, constellation points in the two-dimensional mother modulation constellation may be symmetrical with respect to an x axis and a y axis. For example, coordinates of constellation points in each constellation are respectively (±a, ±b), where a and b are positive real numbers. A first constellation may be a 16QAM Gray modulation constellation determined by b5, b3, b2, and b0, and a second constellation may be a 16QAM Gray modulation constellation determined by b4, b3, b1, and b0.

Referring to FIG. 9, the first constellation may be determined by information bits on locations b5, b3, b2, and b0, and information bits on locations b4 and b1 cannot be used for distinguishing. In other words, for each constellation point, information bits on locations b5, b3, b2, and b0 may be 1 or 0, and information bits on locations b4 and b1 are 1 and 0. For six information bits corresponding to each constellation point, specifically refer to FIG. 9, and details are not described herein again.

The second constellation may be determined by information bits on locations b4, b3, b1, and b0, and information bits on locations b5 and b2 cannot be used for distinguishing. In other words, for each constellation point, information bits on locations b4, b3, b1, and b0 may be 1 or 0, and information bits on locations b5 and b2 are 1 and 0. For six information bits corresponding to each constellation point, specifically refer to FIG. 9, and details are not described herein again.

Table 5 shows the 64-point SCMA codebook obtained based on the two-dimensional mother modulation constellation shown in FIG. 9. Referring to Table 5 and FIG. 9, a constellation point $(a_1, b_1)$ in the first constellation and a constellation point $(a_1, b_1)$ in the second constellation may be used to jointly indicate a value 000000 of the information bits. Likewise, a constellation point $(a_1, b_2)$ in the first constellation and a constellation point $(a_1, b_2)$ in the second constellation may be used to jointly indicate the value 000001 of the information bits, and by analog.

Based on the foregoing design, the 64-point information bit may be mapped to two 16QAM Gray modulation constellations included in the two-dimensional mother modulation constellation.

TABLE 5

| Bit | $I_1$ | $Q_1$ | $I_2$ | $Q_2$ |
|---|---|---|---|---|
| 000000 | $a_1$ | $b_1$ | $a_1$ | $b_1$ |
| 000001 | $a_1$ | $b_2$ | $a_1$ | $b_2$ |
| 000010 | $a_1$ | $b_1$ | $a_2$ | $b_1$ |
| 000011 | $a_1$ | $b_2$ | $a_2$ | $b_2$ |
| 000100 | $a_2$ | $b_1$ | $a_1$ | $b_1$ |
| 000101 | $a_2$ | $b_2$ | $a_1$ | $b_2$ |
| 000110 | $a_2$ | $b_1$ | $a_2$ | $b_1$ |
| 000111 | $a_2$ | $b_2$ | $a_2$ | $b_2$ |
| 001000 | $a_1$ | $-b_1$ | $a_1$ | $-b_1$ |
| 001001 | $a_1$ | $-b_2$ | $a_1$ | $-b_2$ |
| 001010 | $a_1$ | $-b_1$ | $a_2$ | $-b_1$ |
| 001011 | $a_1$ | $-b_2$ | $a_2$ | $-b_2$ |
| 001100 | $a_2$ | $-b_1$ | $a_1$ | $-b_1$ |
| 001101 | $a_2$ | $-b_2$ | $a_1$ | $-b_2$ |
| 001110 | $a_2$ | $-b_1$ | $a_2$ | $-b_1$ |
| 001111 | $a_2$ | $-b_2$ | $a_2$ | $-b_2$ |
| 010000 | $a_1$ | $b_1$ | $-a_1$ | $b_1$ |
| 010001 | $a_1$ | $b_2$ | $-a_1$ | $b_2$ |
| 010010 | $a_1$ | $b_1$ | $-a_2$ | $b_1$ |
| 010011 | $a_1$ | $b_2$ | $-a_2$ | $b_2$ |
| 010100 | $a_2$ | $b_1$ | $-a_1$ | $b_1$ |
| 010101 | $a_2$ | $b_2$ | $-a_1$ | $b_2$ |
| 010110 | $a_2$ | $b_1$ | $-a_2$ | $b_1$ |
| 010111 | $a_2$ | $b_2$ | $-a_2$ | $b_2$ |
| 011000 | $a_1$ | $-b_1$ | $-a_1$ | $-b_1$ |
| 011001 | $a_1$ | $-b_2$ | $-a_1$ | $-b_2$ |
| 011010 | $a_1$ | $-b_1$ | $-a_2$ | $-b_1$ |
| 011011 | $a_1$ | $-b_2$ | $-a_2$ | $-b_2$ |
| 011100 | $a_2$ | $-b_1$ | $-a_1$ | $-b_1$ |
| 011101 | $a_2$ | $-b_2$ | $-a_1$ | $-b_2$ |
| 011110 | $a_2$ | $-b_1$ | $-a_2$ | $-b_1$ |
| 011111 | $a_2$ | $-b_2$ | $-a_2$ | $-b_2$ |
| 100000 | $-a_1$ | $b_1$ | $a_1$ | $b_1$ |
| 100001 | $-a_1$ | $b_2$ | $a_1$ | $b_2$ |
| 100010 | $-a_1$ | $b_1$ | $a_2$ | $b_1$ |
| 100011 | $-a_1$ | $b_2$ | $a_2$ | $b_2$ |
| 100100 | $-a_2$ | $b_1$ | $a_1$ | $b_1$ |
| 100101 | $-a_2$ | $b_2$ | $a_1$ | $b_2$ |
| 100110 | $-a_2$ | $b_1$ | $a_2$ | $b_1$ |
| 100111 | $-a_2$ | $b_2$ | $a_2$ | $b_2$ |
| 101000 | $-a_1$ | $-b_1$ | $a_1$ | $-b_1$ |
| 101001 | $-a_1$ | $-b_2$ | $a_1$ | $-b_2$ |
| 101010 | $-a_1$ | $-b_1$ | $a_2$ | $-b_1$ |
| 101011 | $-a_1$ | $-b_2$ | $a_2$ | $-b_2$ |
| 101100 | $-a_2$ | $b_1$ | $a_1$ | $-b_1$ |
| 101101 | $-a_2$ | $-b_2$ | $a_1$ | $-b_2$ |
| 101110 | $-a_2$ | $b_1$ | $a_2$ | $-b_1$ |
| 101111 | $-a_2$ | $-b_2$ | $a_2$ | $-b_2$ |
| 110000 | $-a_1$ | $b_1$ | $-a_1$ | $b_1$ |
| 110001 | $-a_1$ | $b_2$ | $-a_1$ | $b_2$ |
| 110010 | $-a_1$ | $b_1$ | $-a_2$ | $b_1$ |
| 110011 | $-a_1$ | $b_2$ | $-a_2$ | $b_2$ |
| 110100 | $-a_2$ | $b_1$ | $-a_1$ | $b_1$ |
| 110101 | $-a_2$ | $b_2$ | $-a_1$ | $b_2$ |
| 110110 | $-a_2$ | $b_1$ | $-a_2$ | $b_1$ |
| 110111 | $-a_2$ | $b_2$ | $-a_2$ | $b_2$ |
| 111000 | $-a_1$ | $-b_1$ | $-a_1$ | $-b_1$ |
| 111001 | $-a_1$ | $-b_2$ | $-a_1$ | $-b_2$ |
| 111010 | $-a_1$ | $-b_1$ | $-a_2$ | $-b_1$ |
| 111011 | $-a_1$ | $-b_2$ | $-a_2$ | $-b_2$ |
| 111100 | $-a_2$ | $-b_1$ | $-a_1$ | $-b_1$ |
| 111101 | $-a_2$ | $-b_2$ | $-a_1$ | $-b_2$ |
| 111110 | $-a_2$ | $-b_1$ | $-a_2$ | $-b_1$ |
| 111111 | $-a_2$ | $-b_2$ | $-a_2$ | $-b_2$ |

It should be understood that, the two-dimensional mother modulation constellation may be directly used as a codebook. In another embodiment, alternatively, an operation may be performed on the two-dimensional mother modulation constellation in this embodiment to obtain a two-dimensional modulation constellation, and the obtained two-dimensional modulation constellation is used as a codebook. In this way, according to a particular resource mapping rule, a multidimensional modulation symbol for each data layer in the SCMA codebook may be obtained in the following manner: Each data layer may use a same multidimensional mother modulation constellation to generate a respective multidimensional modulation symbol; each data layer may use a same multidimensional mother modulation constellation to perform rotation by different angles and power adjustment to generate a respective multidimensional modulation symbol; or each data layer may select different multidimensional mother modulation constellations and perform rotation by a particular angle and power adjustment on the multidimensional mother modulation constellations to generate a respective multidimensional modulation symbol.

Specifically, using three information bits as an example, one operation is to allocate same power to each constellation point in the two-dimensional mother modulation constellation, that is, to enable a real part and an imaginary part of each constellation point to be equal (a=b). For example, 000 is mapped to constellation points (a, a) and (a, a), 001 is mapped to constellation points (a, a) and (a, −a), and by analog. Alternatively, a real part and an imaginary part of each constellation point may be amplified and reduced according to different ratios (a≠b). For example, 000 is mapped to a constellation point (a, 2b) in a first constellation and a constellation point (a, 2b) in a second constellation, 001 is mapped to a constellation point (a, 2b) in a first constellation and a constellation point (a, −2b) in a second constellation, and by analog.

Another operation is to use a QPSK Gray constellation in another form to obtain the two-dimensional mother modulation constellation, for example, change a mapping relationship between constellation points in each constellation and values of information bits to generate a two-dimensional mother modulation constellation, and use the generated two-dimensional mother modulation constellation as a codebook. For example, values of information bits corresponding to the constellation point (a, b) and those corresponding to the constellation point (a, −b) in the first constellation in FIG. 5 may be exchanged. The values of the information bits corresponding to the constellation point (a, b) are changed to 100 and 101, and the values of the information bits corresponding to the constellation point (−a, b) are changed to 001 and 000. In this case, the value 000 of the information bits is mapped to the constellation point (−a, b) in the first constellation and the constellation point (a, b) in the second constellation. Therefore, the constellation point (−a, b) in the first constellation and the constellation point (a, b) in the second constellation may be used to jointly indicate the value 000 of the information bits, and by analog.

Still another operation is to perform rotation by a particular angle (for example, rotation by 45 degrees or rotation by 90 degrees) on all constellations of the two-dimensional mother modulation constellation, to obtain a corresponding two-dimensional modulation constellation, where different angles correspond to different two-dimensional modulation constellations; and use the obtained two-dimensional modulation constellation as a codebook. The rotation angle is not limited in this embodiment of this application, provided that different two-dimensional modulation constellations can be distinguished.

It should be understood that, in this embodiment of this application, a method for generating the codebook based on the multidimensional mother modulation constellation is not limited to the foregoing method, and other methods for generating the codebook based on the multidimensional mother modulation constellation may also be applied to this embodiment of this application.

The codebook generation method and the data transmission method according to the embodiments of this application are described above. A data transmission apparatus according to the embodiments of this application is described below with reference to FIG. 10 to FIG. 12.

Figure 10:
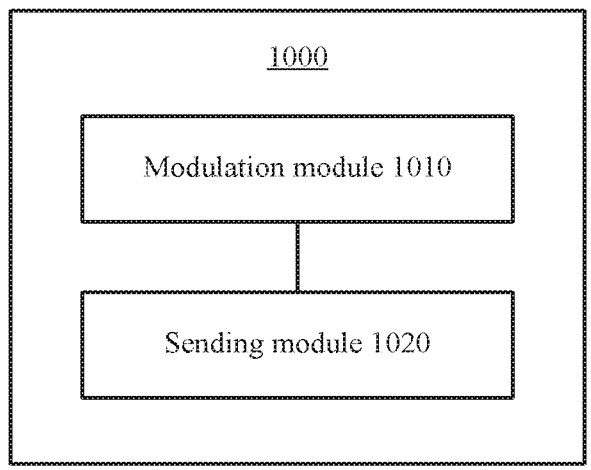
FIG. 10 is a schematic structural diagram of a data transmission apparatus according to an embodiment of this application.

FIG. 10 is a schematic structural diagram of a data transmission apparatus 1000 located at a transmit end according to an embodiment of this application. The apparatus 1000 includes a modulation module 1010 and a sending module 1020.

A modulation module 1010 is configured to modulate, based on a codebook, every N information bits of to-be-transmitted data into one M-dimensional modulation symbol. The codebook is generated based on an M-dimensional modulation constellation, the M-dimensional modulation constellation includes M modulation constellations, a constellation point in an $m^{th}$ modulation constellation in the M modulation constellations is obtained by mapping N information bits based on an $m^{th}$ information bit subset, the $m^{th}$ information bit subset includes information bits on some locations in the N information bits, and a union set of M information bit subsets respectively corresponding to the M modulation constellations is the N information bits, where M and N are integers greater than or equal to 2, and m is 1, 2, . . . , or M. The sending module 1020 is configured to send the generated M-dimensional modulation symbol.

According to this embodiment of this application, the codebook used to generate the M-dimensional modulation symbol is generated based on the M-dimensional modulation constellation, the M-dimensional modulation constellation includes the M modulation constellations, the constellation point in the $m^{th}$ modulation constellation in the M modulation constellations is obtained by mapping the N information bits based on the $m^{th}$ information bit subset, the $m^{th}$ information bit subset includes the information bits on the some locations in the N information bits, and the union set of the M information bit subsets respectively corresponding to the M modulation constellations is the N information bits. In this embodiment of this application, because the M-dimensional mother modulation constellation is determined by directly selecting an information bit subset from the N information bits, complexity of demodulating a modulation symbol is reduced.

According to this embodiment of this application, any two of the M information bit subsets are different.

According to this embodiment of this application, the codebook is specifically generated in the following manner: adjusting power of real parts and/or imaginary parts of constellation points in the M-dimensional mother modulation constellation, to obtain an adjusted M-dimensional modulation constellation; and generating the codebook based on the adjusted M-dimensional modulation constellation.

According to this embodiment of this application, the codebook is specifically generated in the following manner: performing angle rotation on constellation points in the M-dimensional mother modulation constellation, to obtain a rotated M-dimensional modulation constellation; and generating the codebook based on the rotated M-dimensional mother modulation constellation.

According to this embodiment of this application, the codebook is a set of M-dimensional modulation symbols, and the codebook is used to indicate a mapping relationship between information bits and modulation symbols.

For operations and functions of the modules of the data transmission apparatus 1000, refer to the method in FIG. 3. To avoid repetition, details are not described herein again.

Figure 11:
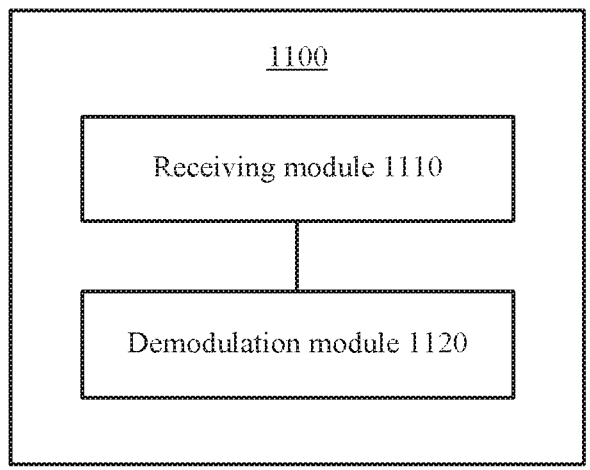
FIG. 11 is a schematic structural diagram of a data transmission apparatus according to another embodiment of this application.

FIG. 11 is a schematic structural diagram of a data transmission apparatus 1100 located at a receive end according to an embodiment of this application. The apparatus 1100 includes a receiving module 1110 and a demodulation module 1120.

The receiving module 1110 is configured to receive an M-dimensional modulation symbol. The demodulation module 1120 is configured to demodulate, based on a codebook, the M-dimensional modulation symbol to generate transmitted data. The codebook is generated based on an M-dimensional modulation constellation, the M-dimensional modulation constellation includes M modulation constellations, a constellation point in an $m^{th}$ modulation constellation in the M modulation constellations is obtained by mapping N information bits based on an $m^{th}$ information bit subset, the $m^{th}$ information bit subset includes information bits on some locations in the N information bits, and a union set of M information bit subsets respectively corresponding to the M modulation constellations is the N information bits, where M and N are integers greater than or equal to 2, and m is 1, 2, . . . , or M.

According to this embodiment of this application, the codebook used to demodulate the M-dimensional modulation symbol is generated based on the M-dimensional modulation constellation, the M-dimensional modulation constellation includes the M modulation constellations, the constellation point in the $m^{th}$ modulation constellation in the M modulation constellations is obtained by mapping the N information bits based on the $m^{th}$ information bit subset, the $m^{th}$ information bit subset includes the information bits on the some locations in the N information bits, and the union set of the M information bit subsets respectively corresponding to the M modulation constellations is the N information bits. In this embodiment of this application, because the M-dimensional mother modulation constellation is determined by directly selecting an information bit subset from the N information bits, complexity of demodulating a modulation symbol is reduced.

In some embodiments, any two of the M information bit subsets are different.

In some embodiments, the codebook is specifically generated in the following manner: adjusting power of real parts and/or imaginary parts of constellation points in the M-dimensional mother modulation constellation, to obtain an adjusted M-dimensional modulation constellation; and generating the codebook based on the adjusted M-dimensional modulation constellation.

In some embodiments, the codebook is specifically generated in the following manner: performing angle rotation on constellation points in the M-dimensional mother modulation constellation, to obtain a rotated M-dimensional modulation constellation; and generating the codebook based on the rotated M-dimensional mother modulation constellation.

In some embodiments, the codebook is a set of M-dimensional modulation symbols, and the codebook is used to indicate a mapping relationship between information bits and modulation symbols.

For operations and functions of the modules of the data transmission apparatus 1100, refer to the method in FIG. 4. To avoid repetition, details are not described herein again.

Figure 12:
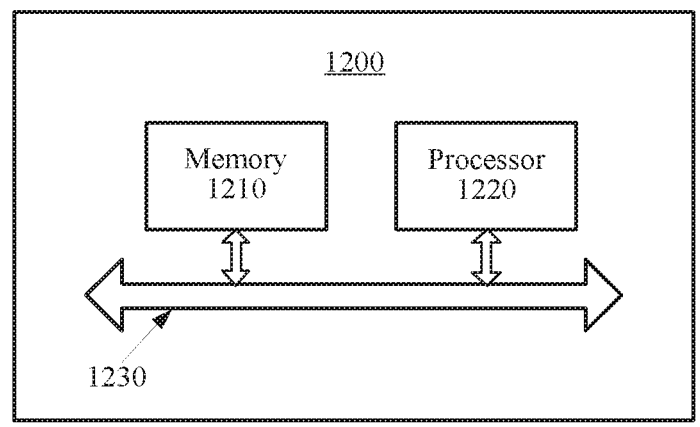
FIG. 12 is a schematic structural diagram of a device according to an embodiment of this application.

FIG. 12 is a schematic structural diagram of a device 1200 according to an embodiment of this application. As shown in FIG. 12, the device 1200 includes:

a memory 1210, a processor 1220, and a bus system 1230. The memory 1210 and the processor 1220 are connected by using the bus system 1230. The memory 1210 is configured to store an instruction, the processor 1220 is configured to execute the instruction stored in the memory 1210, to perform the methods in the embodiment of FIG. 3 and FIG. 4.

It should further be understood that in this embodiment of this application, the processor 1220 may be a central processing unit (Central Processing Unit, "CPU" for short), or the processor 1220 may be another general purpose processor, a digital signal processor (DSP), an application-specific integrated circuit (ASIC), a field programmable gate array (FPGA), another programmable logic device, discrete gate or transistor logic device, discrete hardware component, or the like. The general purpose processor may be a microprocessor, or the processor may be any conventional processor or the like.

The memory 1210 may include a read-only memory and a random access memory, and provide an instruction and data to the processor. A part of the memory may further include a non-volatile random access memory. For example, the memory may further store information about a device type.

The bus system 1230 may further include a power bus, a control bus, a status signal bus, and the like, in addition to a data bus. However, for clear description, various types of buses in the figure are marked as the bus system.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
    modulating, based on a codebook, every N information bits of to-be-transmitted data into one M-dimensional modulation symbol, wherein the codebook is generated based on an M-dimensional modulation constellation, the M-dimensional modulation constellation comprises M modulation constellations, a constellation point in an $m^{th}$ modulation constellation in the M modulation constellations is obtained by mapping N information bits based on an $m^{th}$ information bit subset, the $m^{th}$ information bit subset consists of information bits on some locations in the N information bits, and a union set of M information bit subsets respectively corresponding to the M modulation constellations is the N information bits, wherein M and N are integers greater than or equal to 2, and m is 1, 2, . . . , or M; and
    sending the generated M-dimensional modulation symbol.

2. The method according to claim 1, wherein any two of the M information bit subsets are different.

3. The method according to claim 1, wherein the codebook is specifically generated in the following manner:
    adjusting power of real parts and/or imaginary parts of constellation points in the M-dimensional modulation constellation, to obtain an adjusted M-dimensional modulation constellation; and
    generating the codebook based on the adjusted M-dimensional modulation constellation.

4. The method according to claim 1, wherein the codebook is specifically generated in the following manner:
    performing angle rotation on constellation points in the M-dimensional modulation constellation, to obtain a rotated M-dimensional modulation constellation; and
    generating the codebook based on the rotated M-dimensional modulation constellation.

5. A data transmission apparatus, comprising:
    a modulation module, configured to modulate, based on a codebook, every N information bits of to-be-transmitted data into one M-dimensional modulation symbol, wherein the codebook is generated based on an M-dimensional modulation constellation, the M-dimensional modulation constellation comprises M modulation constellations, a constellation point in an $m^{th}$ modulation constellation in the M modulation constellations is obtained by mapping N information bits based on an $m^{th}$ information bit subset, the $m^{th}$ information bit subset consists of information bits on some locations in the N information bits, and a union set of M information bit subsets respectively corresponding to the M modulation constellations is the N information bits, wherein M and N are integers greater than or equal to 2, and m is 1, 2, . . . , or M; and
    a sending module, configured to send the generated M-dimensional modulation symbol.

6. The apparatus according to claim 5, wherein any two of the M information bit subsets are different.

7. The apparatus according to claim 5, wherein the codebook is specifically generated in the following manner:
    adjusting power of real parts and/or imaginary parts of constellation points in the M-dimensional modulation constellation, to obtain an adjusted M-dimensional modulation constellation; and generating the codebook based on the adjusted M-dimensional modulation constellation.

8. The apparatus according to claim 5, wherein the codebook is specifically generated in the following manner:
    performing angle rotation on constellation points in the M-dimensional modulation constellation, to obtain a rotated M-dimensional modulation constellation; and
    generating the codebook based on the rotated M-dimensional modulation constellation.

9. A data transmission apparatus, comprising:
    a receiving module, configured to receive an M-dimensional modulation symbol; and
    a demodulation module, configured to demodulate, based on a codebook, the M-dimensional modulation symbol to obtain transmitted data, wherein the codebook is generated based on an M-dimensional modulation constellation, the M-dimensional modulation constellation comprises M modulation constellations, a constellation point in an $m^{th}$ modulation constellation in the M modulation constellations is obtained by mapping N information bits based on an $m^{th}$ information bit subset, the $m^{th}$ information bit subset consists of information bits on some locations in the N information bits, and a union set of M information bit subsets respectively corresponding to the M modulation constellations is the N information bits, wherein M and N are integers greater than or equal to 2, and m is 1, 2, . . . , or M.

10. The apparatus according to claim 9, wherein any two of the M information bit subsets are different.

11. The apparatus according to claim 9, wherein the codebook is specifically generated in the following manner:
    adjusting power of real parts and/or imaginary parts of constellation points in the M-dimensional modulation constellation, to obtain an adjusted M-dimensional modulation constellation; and generating the codebook based on the adjusted M-dimensional modulation constellation.

12. The apparatus according to claim 9, wherein the codebook is specifically generated in the following manner:
    performing angle rotation on constellation points in the M-dimensional modulation constellation, to obtain a rotated M-dimensional modulation constellation; and
    generating the codebook based on the rotated M-dimensional modulation constellation.

* * * * *